(12) United States Patent
Murray, Sr.

(10) Patent No.: US 10,610,033 B2
(45) Date of Patent: Apr. 7, 2020

(54) TEMPLATE KIT FOR DRILLING HOLES AND MOUNTING OBJECTS

(71) Applicant: KellyJohn H. Murray, Sr., Richlands, NC (US)

(72) Inventor: KellyJohn H. Murray, Sr., Richlands, NC (US)

( * ) Notice: Subject to any disclaimer, the term of this patent is extended or adjusted under 35 U.S.C. 154(b) by 221 days.

(21) Appl. No.: 15/597,356

(22) Filed: May 17, 2017

(65) Prior Publication Data

US 2017/0341220 A1 Nov. 30, 2017

Related U.S. Application Data

(60) Provisional application No. 62/340,623, filed on May 24, 2016.

(51) Int. Cl.

| | |
|---|---|
| *B26F 1/14* | (2006.01) |
| *A47G 1/20* | (2006.01) |
| *B26F 1/38* | (2006.01) |
| *B23B 49/02* | (2006.01) |
| *F16B 11/00* | (2006.01) |
| *B25H 7/00* | (2006.01) |
| *F16B 4/00* | (2006.01) |
| *F16B 1/00* | (2006.01) |

(52) U.S. Cl.
CPC ............ *A47G 1/205* (2013.01); *B23B 49/026* (2013.01); *B25H 7/00* (2013.01); *B26F 1/14* (2013.01); *B26F 1/3846* (2013.01); *F16B 11/006* (2013.01); *F16B 4/004* (2013.01); *F16B 2001/0035* (2013.01)

(58) Field of Classification Search
CPC .......... B26F 1/14; B26F 1/3846; A47G 1/205; Y10T 29/49833
See application file for complete search history.

(56) References Cited

U.S. PATENT DOCUMENTS

| | | | |
|---|---|---|---|
| 788,217 A | * | 4/1905 | Mohr ................... A21C 11/106 24/1 |
| 5,477,620 A | | 12/1995 | Barnett |
| 6,574,880 B2 | | 6/2003 | Lombardo |
| 7,350,312 B1 | | 4/2008 | Grillo |

(Continued)

FOREIGN PATENT DOCUMENTS

WO   WO-2011077076 A1 *  6/2011  ............. A47G 1/205

*Primary Examiner* — Jason L Vaughan
*Assistant Examiner* — Amanda Kreiling
(74) *Attorney, Agent, or Firm* — Boudwin Intellectual Property; Daniel Boudwin

(57) ABSTRACT

A template kit for assisting with the drilling of holes and the mounting of objects to a planar surface. The template kit includes an impactor, a plurality of punch heads removably securable to the impactor, and a sheet of material having a first side and a second side. The first side includes a first adhesive that can releasably secure the object to be mounted. The second side includes a second adhesive that can secure the device to a wall or other planar surface. The second adhesive has increased adhesive strength relative to the first adhesive. Each punch head includes an inner and outer edge that can cut a disc member from the sheet of material, wherein the impactor drives the punch head through the sheet of material. In use, the disc members are secured to a wall and serve as a guide for drilling a hole to hang the object.

7 Claims, 3 Drawing Sheets

(56) References Cited

U.S. PATENT DOCUMENTS

| | | |
|---|---|---|
| 7,958,648 B1 | 6/2011 | MacConnell |
| 8,443,525 B2 | 5/2013 | Reschke |
| 2006/0272165 A1* | 12/2006 | Brenchley ................. B26F 1/32 30/358 |
| 2011/0174953 A1 | 7/2011 | Ruiz et al. |

* cited by examiner

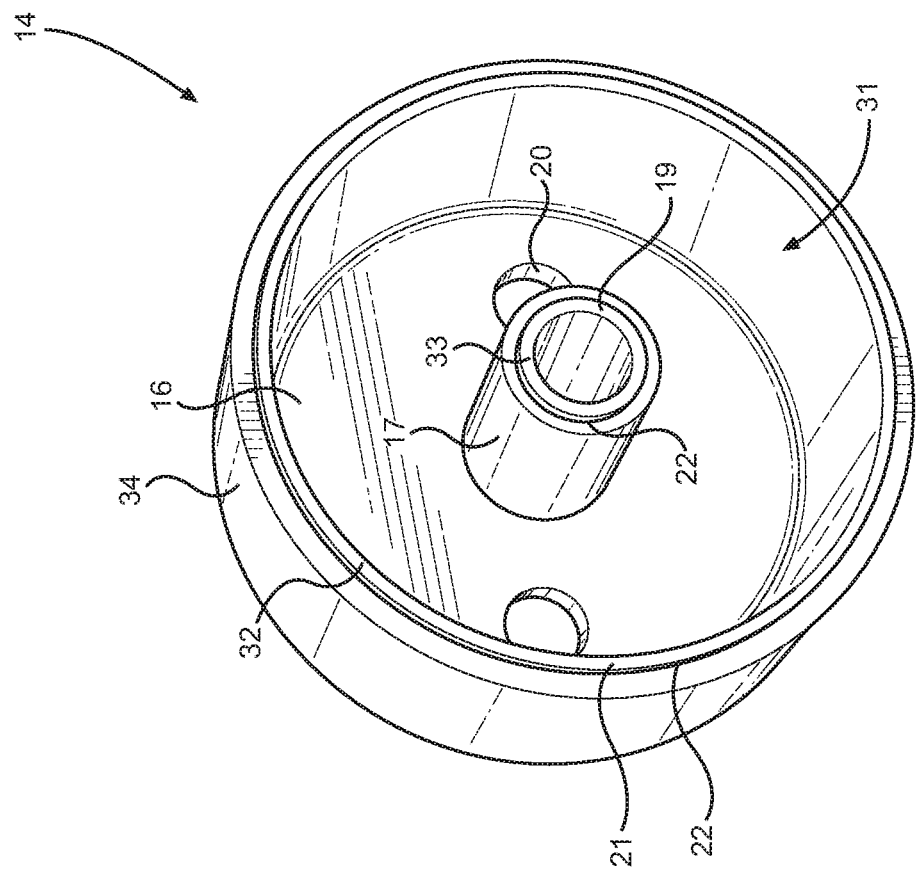
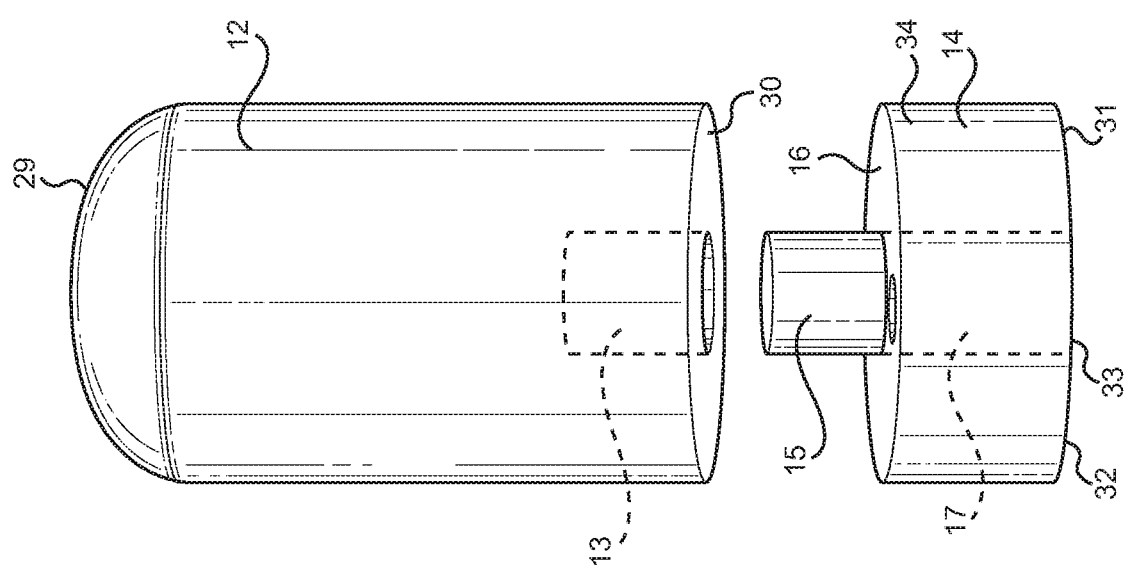

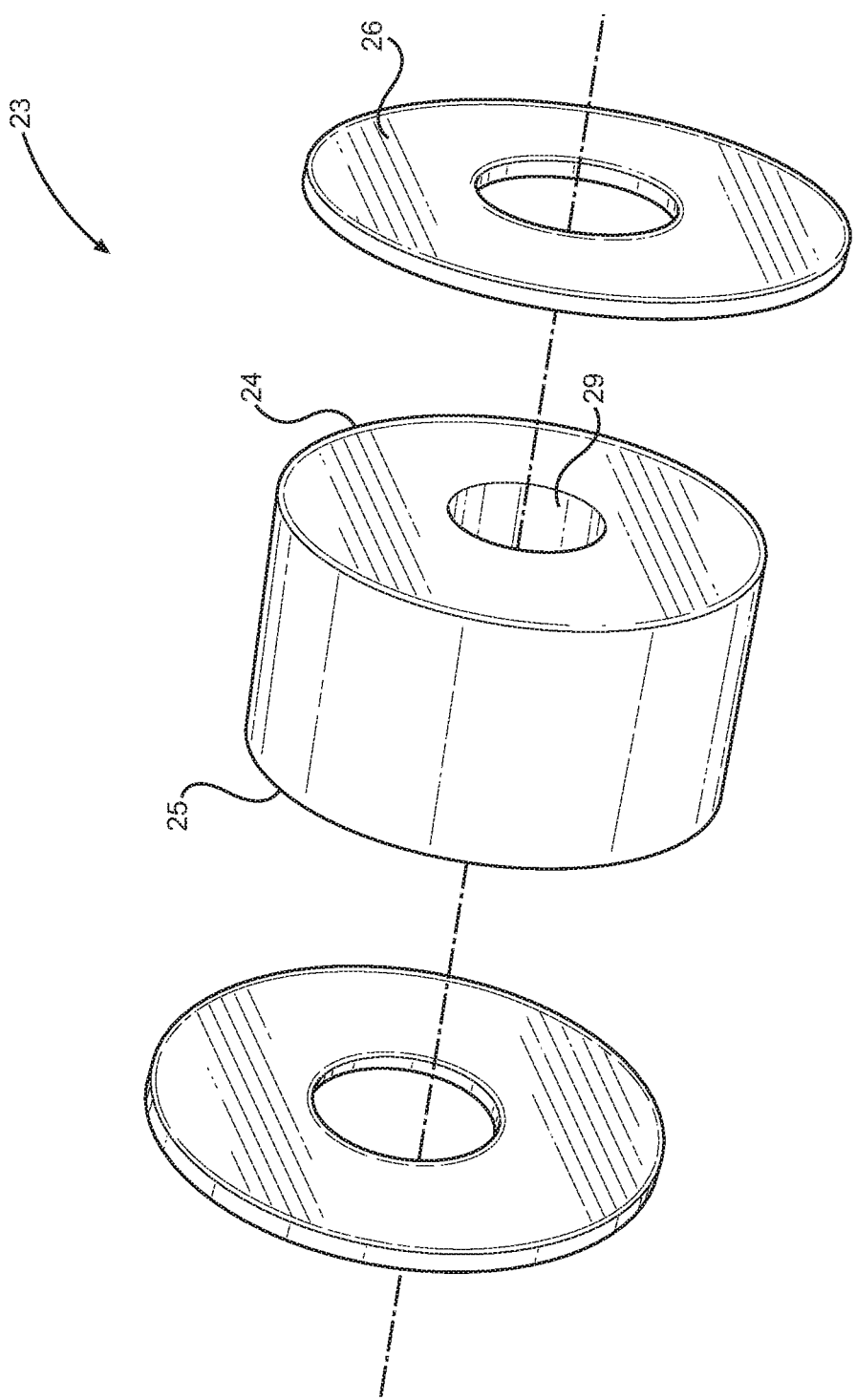

TEMPLATE KIT FOR DRILLING HOLES AND MOUNTING OBJECTS

CROSS REFERENCE TO RELATED APPLICATION

This application claims the benefit of U.S. Provisional Application No. 62/340,623 filed on May 24, 2016. The above identified patent application is herein incorporated by reference in its entirety to provide continuity of disclosure.

BACKGROUND OF THE INVENTION

The present invention relates to template kits for drilling holes and mounting objects to a wall. More specifically, the present invention provides an impactor, a plurality of different sized punch heads each securable to the impactor, and a sheet of material, wherein a first side of the sheet of material includes a first adhesive configured to releasably secure an object thereto and a second side includes a second adhesive configured to secure the material to a wall or other planar surface.

This invention relates to improvements in template devices for drilling holes. Drilling holes and mounting objects is difficult without the proper equipment and expertise. Many individuals would like to hang objects on a wall and other surfaces without having to spend a lot of time measuring and remeasuring proper hole distances for receiving a fastener to hang the object therefrom. Further, it is cumbersome to mount the objects level, resulting in mistakes that cause damage to the wall or surface from multiple drilling attempts. Therefore, there exists a need for a template kit that can provide a variety of sized templates for supporting different objects that allow a user to drill holes in a wall precisely where the user intends without having to measure.

SUMMARY OF THE INVENTION

In view of the foregoing disadvantages inherent in the known types of template kits for drilling holes and mounting objects now present in the prior art, the present invention provides a new template kit for drilling holes and mounting objects wherein the same can be utilized for providing convenience for the user when forming multiple sized disc members for hanging different sized and weighted objects.

It is therefore an object of the present invention to provide a new and improved template kit for drilling holes and mounting objects that has all of the advantages of the prior art and none of the disadvantages. The template kit includes an impactor, a plurality of punch heads removably securable to the impactor, and a sheet of material having a first side and a second side. The first side includes a first adhesive configured to releasably secure an object to be mounted. The second side includes a second adhesive configured to secure the device to a wall or other planar surface. The second adhesive has increased adhesive strength relative to the first adhesive. Each punch head includes an inner and outer edge configured to cut a disc member from the sheet of material, wherein the impactor drives the punch head through the sheet of material. In use, the disc members are secured to a wall and serve as a guide for drilling a hole to hang the object.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows an exploded view of the impactor and a punch head of the template kit for drilling holes and mounting objects.

FIG. 2 shows a perspective view of the lower end of a punch head of the template kit for drilling holes and mounting objects.

FIG. 3 shows an exploded view of an embodiment of the disc member of the template kit for drilling holes and mounting objects.

DETAILED DESCRIPTION OF THE INVENTION

Figure 4:
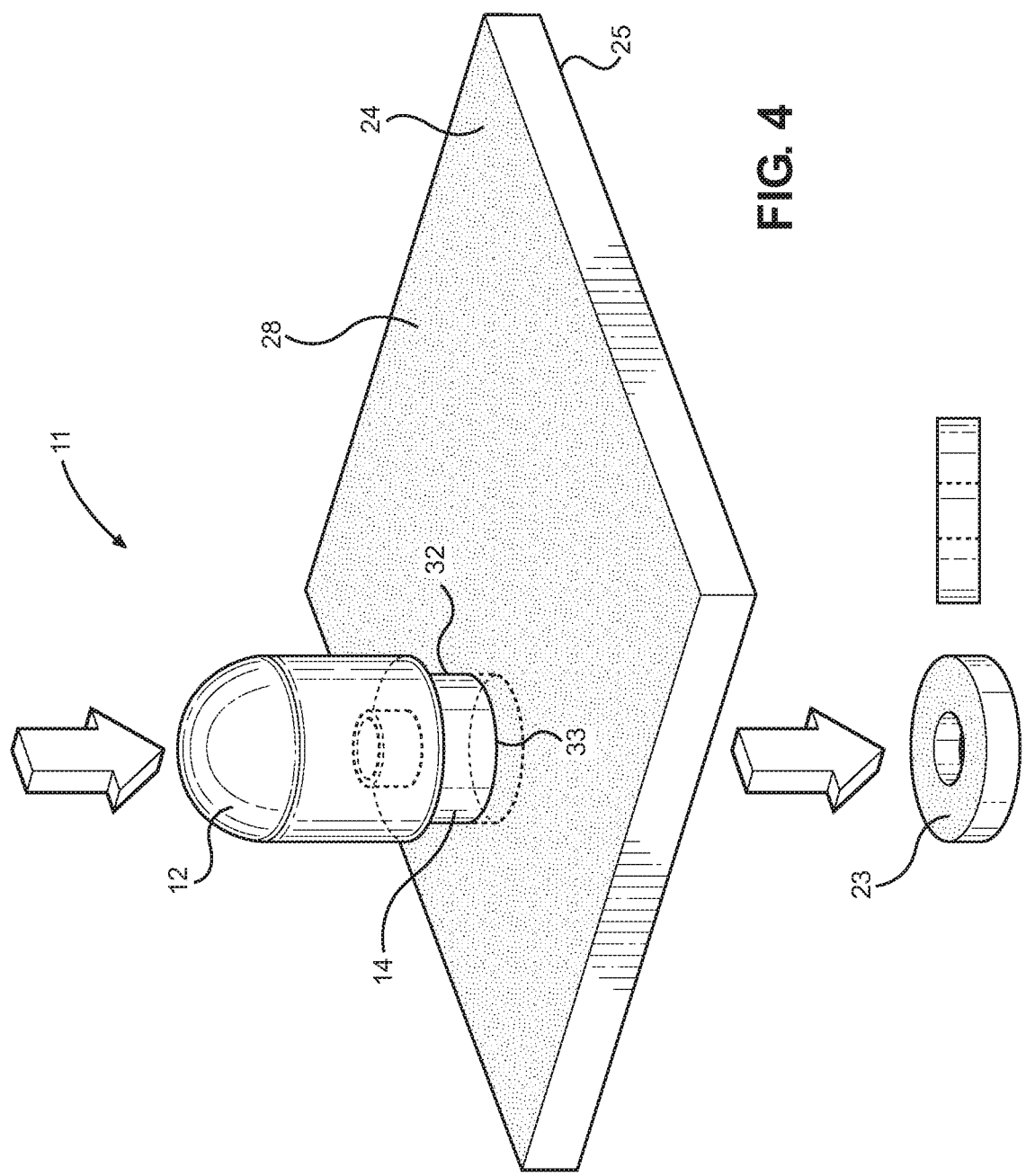
FIG. 4 shows a diagram of the template kit for drilling holes and mounting objects in use.

Reference is made herein to the attached drawings. Like reference numerals are used throughout the drawings to depict like or similar elements of the template kit for drilling holes and mounting objects. For the purposes of presenting a brief and clear description of the present invention, the preferred embodiment will be discussed as used when forming multiple sized disc members for hanging different sized and weighted objects. The figures are intended for representative purposes only and should not be considered to be limiting in any respect.

Referring now to FIG. 1, there is shown an exploded view of the impactor and a punch head of the template kit for drilling holes and mounting objects. The template kit includes an impactor 12, a plurality of punch heads 14 removably securable to the impactor 12, and a sheet of material. The impactor 12 is configured to drive a punch head 14 through the sheet of material in order to form a disc member for securing to a wall for the purpose of drilling a hole and mounting an object thereto without the need for measurements.

In the illustrated embodiment, the impactor 12 comprises a circular shaped lateral cross section and a U-shaped longitudinal cross section, thereby providing a dome-shaped upper end for resting in the palm of a user's hand. A lower end 30 of the of the impactor 12 comprises a recess 13 adapted to receive a protrusion 15 of a punch head 14 for connecting the punch head 14 thereto. In the illustrated embodiment, the recess 13 and protrusion 15 comprise a cylindrical shape. However, in alternate embodiments, the recess 13 comprises any suitable shape configured to receive the protrusion 15. A fastener removably secures the protrusion 15 to the recess 13. In the illustrated embodiment, the recess 13 and protrusion 15 are magnetically securable to one another. However, in other embodiments, the recess 13 of the impactor 12 and the protrusion 15 of the punch head 14 comprise any suitable fastener, such as a press fit or mated threading.

Each punch head 14 comprises an outer edge 32, an inner edge 33, an upper end 16, an open lower end 31, a first sidewall 34 extending from the outer edge 32 between the lower and upper ends 31, 16, and a second sidewall 17 extending from the inner edge 33 between the lower and upper ends 31, 16. In the illustrated embodiment, the second sidewall 17 is concentric with the first sidewall 34. The protrusion 15 extends perpendicularly from the upper end 16 of the punch head 14. When a punch head 14 is connected to the impactor 12, the upper end 16 of the punch head 14 rests flush against the lower end 30 of the impactor 12.

Referring now to FIG. 2, there is shown a perspective view of the lower end of a punch head of the template kit for drilling holes and mounting objects. The outer and inner edge 32, 33 of each punch head 14 are composed of a blade 19, 21 configured to cut through solid material, such as foam and adhesive. In the illustrated embodiment, the blades 19, 21 extend from the inner perimeter 22 of the first and second sidewalls 17, 34. In some embodiments, the blades 19, 21 are detachable from the first and second sidewalls 17, 34 and are, therefore, replaceable.

The outer edge 32 comprises a larger diameter than the diameter of the inner edge 33. In this way, each punch head 14 is configured to cut a pair of concentric circles from the sheet of material. The open lower end 31 of the punch head 14 is configured to receive the material therein. In the illustrated embodiment, each punch head 14 of the plurality of punch heads 14 comprise a different outer edge 32 diameter from one another, wherein the inner edge 33 diameter remains the same. In this way, each punch head 14 is adapted to form varying sized disc members from the sheet of material in order to support the weight of different objects. The larger the diameter of the outer edge 32 the more surface area a disc member will have and, therefore, be able to support a heavier object therefrom.

The upper end 16 of each punch head 14 comprises an aperture 20 in order to clear a disc member that is formed within the punch head 14 after the punch head 14 is driven through the sheet of material. In the illustrated embodiment, a pair of circular apertures 20 are disposed on opposing sides of the inner edge 33. However, in alternate embodiments, an aperture is positioned anywhere along the upper end 16 of the punch head 14.

Referring now to FIGS. 3 and 4, there is shown an exploded view of an embodiment of the disc member of the template kit for drilling holes and mounting objects and a diagram of the template kit for drilling holes and mounting objects in use, respectively. The sheet of material 28 comprises a first side 24 and a second side 25, wherein the first side 24 includes a first adhesive configured to releasably secure to an object to be mounted. The second side 25 includes a second adhesive configured to secure the device to a wall or other planar surface. In the illustrated embodiment, the first and second adhesive completely covers the first and second sides, respectively. The second adhesive has increased adhesive strength relative to the first adhesive. In some embodiments, each side 24, 25 of the sheet of material 28 comprises a layer of protective film 26 adapted to prevent dirt and objects from adhering to the adhesives prior to use. Any suitable protective film 26 can be used, such as parchment paper or siliconized paper. In the illustrated embodiment, the sheet of material 28 comprises a rectangular shape. However, in alternate embodiments, the sheet of material 28 comprises any suitable shape adapted to form a plurality of disc members 23.

In use, the impactor 12 is connected to a punch head 14 having the desired outer edge 32 diameter size. The impactor 12 and punch head 14 are driven through the sheet of material 28 to form the disc member 23. The disc member 23 is cleared from the punch head 14 via the aperture. A channel 29 is formed through the inner edge 33 via the blade disposed therealong.

The protective film 26 is removed from each side 24, 25 of the disc member 23. The first side 24 is secured to an object to be mounted to a wall, such as a picture frame. Once the object is visually aligned for placement on the wall, the second side 25 of the disc member 23 is then adhered to the wall. The object is adhered to the wall momentarily to visually confirm proper alignment of the object. The adhesive disposed on the first side 24 releases prior to the adhesive disposed on the second side 25. Therefore, a user is able to pull the object away from the wall, leaving the disc member 23 still secured to the wall. The channel 29 within the disc member 23 is configured to receive and mark the proper placement for a fastener, such as a screw, in order to serve as a guide for drilling a hole to hang the object. Once the fastener is secured to the wall, the user removes and discards the disc member 23. In the illustrated embodiment, the template kit 11 is disassembled such that the sheet of material 28 is fully formed and the plurality of punch heads 14 are detached from the impactor 12.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A template kit for drilling holes and mounting objects, comprising:
    an impactor;
    a punch head having an inner edge, an outer edge, an upper end, and an open lower end;
    the punch head being entirely removably attachable to the impactor;
    wherein the inner edge and the outer edge define blades configured to cut a solid material;
    a sheet of material having a first side and a second side, wherein the first side comprises a first adhesive and the second side comprises a second adhesive;
    wherein the second adhesive comprises increased adhesive strength relative to the first adhesive.

2. The template kit for drilling holes and mounting objects of claim 1, further comprising a protective film removably disposed on each of the first side and second side of the sheet of material.

3. The template kit for drilling holes and mounting objects of claim 1, wherein the impactor comprises a recess and each of the plurality of punch heads comprise a protrusion, wherein the recess and protrusion comprise a same shape.

4. The template kit for drilling holes and mounting objects of claim 3, wherein the recess and the protrusion are magnetically securable to one another.

5. The template kit for drilling holes and mounting objects of claim 1, wherein the upper end of the punch head comprise an aperture disposed entirely through the punch head for clearing a disc member therefrom.

6. The template kit for drilling holes and mounting objects of claim 1, wherein the plurality of punch heads each comprise a first sidewall extending from the outer edge and a second sidewall extending from the inner edge, wherein the outer edge extends from an inner perimeter of the first sidewall and the inner edge extends from an inner perimeter of a second sidewall.

7. A template kit for drilling holes and mounting objects, comprising:
- an impactor having a recess;
- at least one punch head having an inner edge, an outer edge, an upper end, and an open lower end all disposed oppositely a protrusion;
- each punch head being removably attachable to the impactor via insertion of the protrusion of the punch head into the recess of the impactor;
- wherein the inner edge and outer edge define blades configured to cut a solid material;
- a sheet of material having a first side and a second side, wherein the first side comprises a first adhesive and the second side comprises a second adhesive;
- wherein the second adhesive comprises increased adhesive strength relative to the first adhesive.

\* \* \* \* \*